US010378442B2

(12) United States Patent
Jackowski et al.

(10) Patent No.: US 10,378,442 B2
(45) Date of Patent: Aug. 13, 2019

(54) MECHANICAL FLYWHEEL FOR BOWED ROTOR MITIGATION

(71) Applicant: The Boeing Company, Chicago, IL (US)

(72) Inventors: Jason J. Jackowski, Everett, WA (US); Kent E. Karnofski, Lake Forest Park, WA (US)

(73) Assignee: THE BOEING COMPANY, Chicago, IL (US)

( * ) Notice: Subject to any disclaimer, the term of this patent is extended or adjusted under 35 U.S.C. 154(b) by 139 days.

(21) Appl. No.: 15/475,791

(22) Filed: Mar. 31, 2017

(65) Prior Publication Data

US 2018/0283274 A1    Oct. 4, 2018

(51) Int. Cl.

| F02C 6/14  | (2006.01) |
| F02C 7/20  | (2006.01) |
| F02C 9/26  | (2006.01) |
| F01D 25/34 | (2006.01) |
| F02K 3/06  | (2006.01) |
| F02C 3/107 | (2006.01) |
| F02C 7/32  | (2006.01) |

(Continued)

(52) U.S. Cl.
CPC ............... *F02C 6/14* (2013.01); *B64D 27/10* (2013.01); *F01D 25/34* (2013.01); *F02C 3/107* (2013.01); *F02C 7/20* (2013.01); *F02C 7/32* (2013.01); *F02C 7/36* (2013.01); *F02C 9/26* (2013.01); *F02K 3/06* (2013.01); *B64D 2221/00* (2013.01); *F05D 2220/323* (2013.01); *F05D 2260/43* (2013.01); *F05D 2260/941* (2013.01); *Y02T 50/672* (2013.01)

(58) Field of Classification Search
CPC ....................................................... F02C 6/14
See application file for complete search history.

(56) References Cited

U.S. PATENT DOCUMENTS

| 3,180,614 A |   | 4/1965 | Ellenberger et al. |
| 4,155,266 A | * | 5/1979 | Bradley ............... F02N 15/006 |
|             |   |        | 123/179.25 |

(Continued)

FOREIGN PATENT DOCUMENTS

| EP | 1507068 | 2/2005 |
| EP | 2305986 | 4/2011 |

(Continued)

OTHER PUBLICATIONS

Extended European Search Report dated Jun. 4, 2018 for European Patent Application No. 18160131.1.

(Continued)

*Primary Examiner* — Hussein Elchanti
*Assistant Examiner* — Michael A Berns
(74) *Attorney, Agent, or Firm* — Gates & Cooper LLP (57) ABSTRACT

A mechanical flywheel used to power an aircraft system. In one example, the flywheel is used to rotate a rotor shaft in the aircraft's engine and prevent bowing of the rotor shaft caused by a thermal gradient. In another example, the mechanical flywheel provides electrical power at peak demand times. In yet another example, the flywheel is used as a load source or sink by the engine's control system so as to aid engine operability and engine acceleration rates during abnormal flight conditions.

17 Claims, 9 Drawing Sheets

(51) Int. Cl.
*F02C 7/36* (2006.01)
*B64D 27/10* (2006.01)

(56) References Cited

U.S. PATENT DOCUMENTS

| | | | | |
|---|---|---|---|---|
| 5,760,506 | A * | 6/1998 | Ahlstrom | F16C 32/0438 |
| | | | | 310/74 |
| 8,820,046 | B2 | 9/2014 | Ross et al. | |
| 8,840,061 | B2 * | 9/2014 | Caruel | B64D 27/26 |
| | | | | 244/53 R |
| 9,664,070 | B1 * | 5/2017 | Clauson | F01D 25/36 |
| 10,041,414 | B2 * | 8/2018 | Zaccaria | F02C 7/277 |
| 10,125,636 | B2 * | 11/2018 | Dube | F02C 3/04 |
| 2007/0031249 | A1 * | 2/2007 | Jones | F01D 5/26 |
| | | | | 415/200 |
| 2011/0154805 | A1 * | 6/2011 | Heathco | F01D 15/10 |
| | | | | 60/226.1 |
| 2013/0091850 | A1 | 4/2013 | Francisco | |
| 2014/0373553 | A1 | 12/2014 | Zaccaria et al. | |
| 2016/0348588 | A1 | 12/2016 | Ross et al. | |
| 2017/0082029 | A1 | 3/2017 | Zipperer | |
| 2017/0240269 | A1 * | 8/2017 | Cox | B64C 19/02 |
| 2017/0307050 | A1 * | 10/2017 | Nelson | F16H 3/42 |
| 2018/0283197 | A1 * | 10/2018 | Jackowski | F01D 17/085 |

FOREIGN PATENT DOCUMENTS

| | | |
|---|---|---|
| EP | 2554799 | 2/2013 |
| EP | 2602458 | 6/2013 |
| EP | 3051074 | 8/2016 |
| EP | 3211184 | 8/2017 |
| WO | 2013072291 | 5/2013 |

OTHER PUBLICATIONS

Extended European Search Report dated Oct. 10, 2018 for European Patent Application No. 18163383.5.

* cited by examiner

MECHANICAL FLYWHEEL FOR BOWED ROTOR MITIGATION

BACKGROUND

1. Field

The present disclosure relates to a system for storing and using rotational energy generated in an aircraft gas turbine engine.

2. Description of the Related Art

Figure 1:
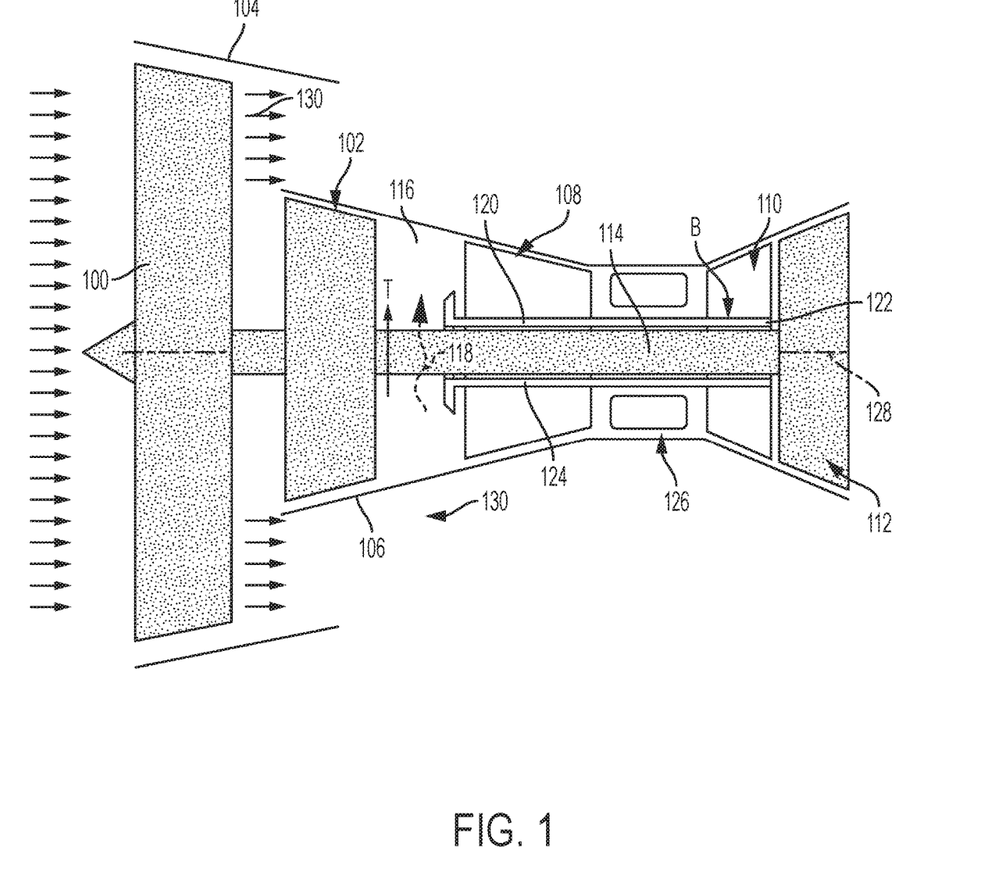
FIG. 1 is a schematic illustration of a gas turbine engine.

FIG. 1 illustrates an aircraft engine comprising a fan 100, a low pressure (LP) compressor 102, a fan case 104, an engine casing 106, a High Pressure (HP) compressor 108, a HP turbine 110, a LP turbine 112, and a LP shaft 114 connecting the LP compressor 102 and the LP turbine 112. After engine shutdown on the ground, residual hot air 116 in the engine core rises 118 and is trapped by the engine casing 106. As the hot air rises 118, the upper portion 120 of the HP compressor's (engine's rotor) 108 rotor shaft 122 becomes hotter than the lower portion 124 of the rotor shaft 122 and causes uneven cooling and thermal deformation of the engine rotor shaft 122 (i.e., rotor bowing, where the upper portion 120 of the rotor shaft 122 becomes longer than the lower portion 124). Upon engine restart (e.g., prior to fuel ignition in the combustor 126), even tiny fractions of rotor shaft 122 bowing can cause the HP compressor (engine's rotor) 108 to rub against the engine's casing 106. The rub causes vibrations (manifested as disconcerting noise in the aircraft cabin) or even damage to the aircraft (e.g., engine damage, damage to the engine case lining, or damage to other accessories).

One method to mitigate these problems is to build the engine with wider cold build clearances ("opened up" clearances), so that the compressor rotor shaft 122 can bow without causing blades to rub on the engine casing 106. However, more advanced engine designs prefer less "gap" between the engine casing and the compressor rotors (tighter "cold build clearances") to reduce air leakage and improve thrust specific fuel consumption (TSFC). Thus, the overriding need to reduce fuel consumption renders wider cold build clearances less desirable. Indeed, as ever tighter cold build clearances are implemented, the problems caused by engine rub will become more severe.

Conceivably, an engine architecture could add rotor stiffening or bearing arrangements to reduce the amount of rotor shaft bow that is physically possible. However, these architecture changes would add weight and manufacturing cost to the engine.

Other methods of mitigating rotor shaft bow comprise rotating the shaft (1) so that the shaft cools uniformly, returns to thermal equilibrium, and straightens, and/or (2) so that centrifugal forces straighten the bow. The shaft rotation is achieved (1) by motoring the engine at relatively low revolutions per minute (RPM) after starting the engine (but before running the engine at high RPM) and/or (2) using an Engine Turning Motor (ETM) to turn the rotor shaft when the engine is off.

However, conventional methods for providing power to the ETM or the engine so as to straighten the bow can be problematic. Some smaller aircraft, such as the Boeing 737 airplane, fly into remote airports where facility power is not available to power the ETM or engine. Furthermore, auxiliary power unit (APU) power on the aircraft is not always available to power the engine or ETM because some airports limit APU use at gates due to emissions and noise concerns and aircraft are not powered when they are towed between gates. In addition, airplanes may operate with a nonfunctional APU or the powering of the ETM or engine may cause undesirable APU wear (extended motoring prolongs the APU's exposure to main engine start (MES) mode, reducing APU life). Finally, the use of lithium-ion and nickel-cadmium batteries for powering the ETM is problematic due to high failure rates and flammability concerns associated with the engine environment (extreme heat, extreme cold, and high vibration).

Moreover, rotating the shaft shortly before departure causes departure delays, especially if reduced engine clearances require turning the rotor at low speeds. These delays not only inconvenience the passengers but also increase costs associated with increased waiting times and parking fees.

What is needed then, is a more efficient method for mitigating rotor shaft bowing that simplifies ground logistics. The present disclosure satisfies this need.

SUMMARY

The present disclosure describes an aircraft engine, comprising a gas turbine engine having a rotor shaft; a casing housing the rotor shaft; and means for transferring rotational energy between the rotor shaft and a flywheel.

The means for transferring the rotational energy typically comprises a first transmission connecting the rotor shaft to a gearbox.

In one embodiment, the flywheel is connected to the gearbox attached to the casing and the first transmission transmits rotational energy from the rotor shaft to the flywheel. The first transmission also transmits a portion of the rotational energy from the flywheel to the rotor shaft when the rotor shaft is cooling down in the temperature gradient, thereby reducing or preventing thermal bowing of the rotor shaft in the temperature gradient.

In another embodiment, a second transmission connects the flywheel to a first motor, the gearbox is connected to a first generator, and the first motor is connected to the first generator. The first transmission transmits rotational energy of the rotor shaft to the first generator, the first generator converts the rotational energy into first electrical energy, and the first electrical energy is used to power the first motor driving the flywheel, thereby transferring a portion of the rotational energy of the rotor shaft to the flywheel.

In another embodiment, a third transmission connects the flywheel to a second generator, the gearbox is connected to a second motor, and the second motor is connected to the second generator. The second generator converts rotational energy of the flywheel into second electrical energy used to power the second motor, after the rotational energy is transmitted from the rotor shaft to the flywheel. The second motor drives the rotor shaft, using the second electrical energy, when the rotor shaft is cooling down in the temperature gradient, thereby reducing or preventing thermal bowing of the rotor shaft in the temperature gradient.

In yet another embodiment, an energy storage device is connected to the second generator and stores the second electrical energy.

In yet a further embodiment, the second generator converts rotational energy of the flywheel into the second electrical energy used to power to an aircraft electrical system during times of peak electrical loading of the electrical system. A computer connected to the electrical system and the gas turbine engine reduces fuel consumption in the gas turbine engine as compared to when the gas turbine engine is used to power the electrical system during the times of peak electrical loading without the use of the flywheel.

The flywheel, motor connected to the flywheel, and generator connected to the flywheel, are installed at any location on the aircraft including, but not limited to, on the engine itself, in the aircraft's wing, or within the aircraft's fuselage.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

The present disclosure describes transferring mechanical energy from an engine rotor shaft (e.g., generated when the engine is being operated using fuel and air 130 is inputted into the engine) to a flywheel, thereby storing the mechanical energy in the flywheel.

The rotational energy stored in the flywheel is later extracted or harvested to power an aircraft system. Examples of applications include providing additional power to the aircraft system (supplementing an already existing power source), or as the sole power source when the aircraft is otherwise de-powered (e.g., when the aircraft is not powered by an auxiliary power unit or engine on the aircraft or by a power unit at the airport). Examples of aircraft systems include engine systems or electrical systems.

Energy transfer comprises purely mechanical transfer of energy between the engine shaft and the flywheel and/or conversion of mechanical energy into other forms. Several examples of means for transferring rotational energy between the flywheel and the rotor shaft, as well as conversion of the rotational energy to other forms, are described below.

First Example: Gearbox Installation

Figure 2:
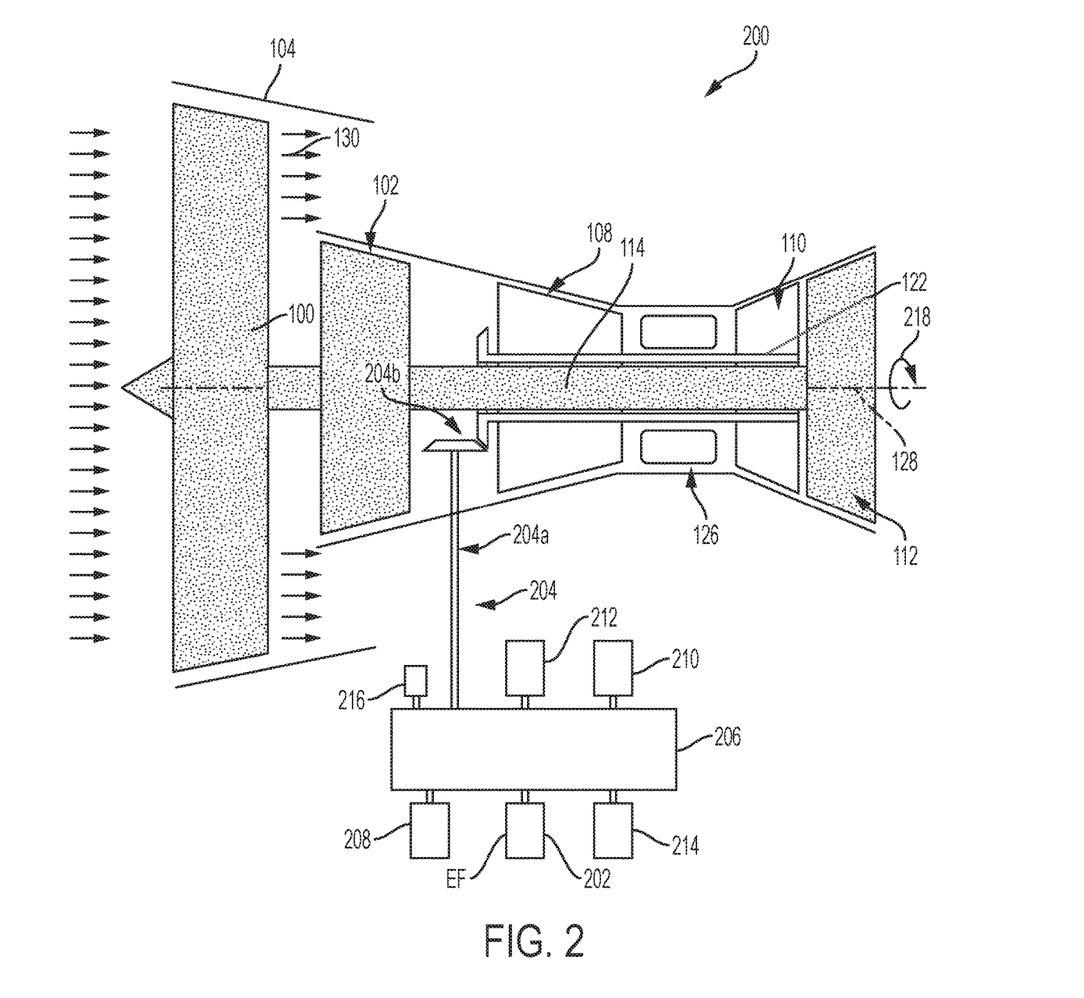
FIG. 2 illustrates flywheel installation on an accessory gearbox of a two spool engine, according to one or more embodiments.

FIG. 2 illustrates an apparatus or system, comprising a gas turbine engine 200 having a rotor (HP compressor 108) including a rotor shaft 122; a flywheel 202; and a first transmission 204 (comprising tower or drive shaft 204a and bevel gears 204b) connecting the rotor's shaft 122 to an accessory gearbox 206. The flywheel 202 is connected to and installed on the gearbox 206. Also shown are a generator 208, fuel pump 210, lube module 212, hydraulic pump 214, and a permanent magnet generator (PMG) 216 connected to the gearbox 206. In one embodiment, the gearbox is attached to the casing 106.

Second Example: Mechanical-Electrical Energy Conversion

Figure 3A:
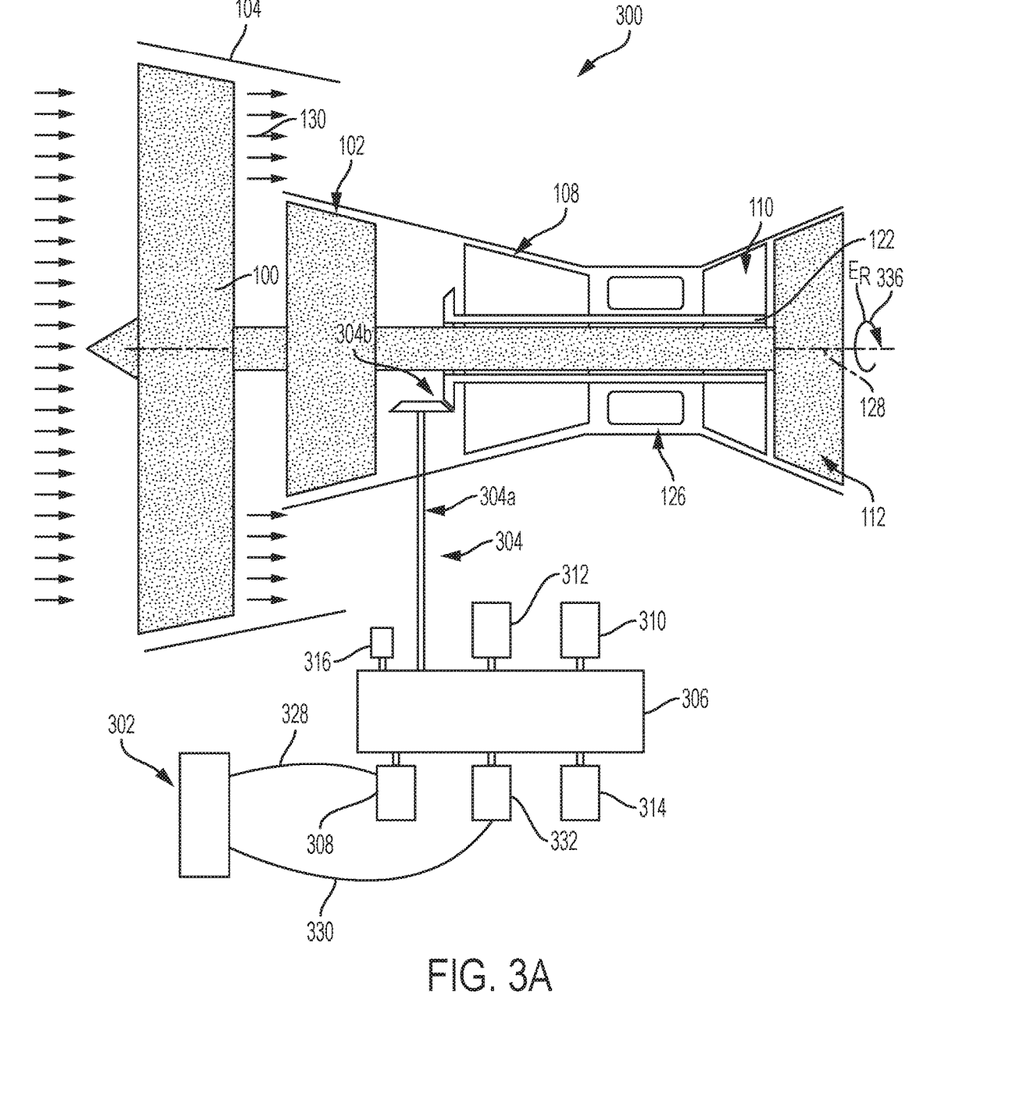
FIG. 3A illustrates installation of a flywheel on an aircraft but remote from the engine, according to one or more embodiments.

FIG. 3A illustrates an apparatus or system, comprising a gas turbine engine 300 having a rotor (HP compressor 108) including a rotor shaft 122); a housing 302 comprising a flywheel and motor generator; a first transmission 304 (comprising tower shaft 304a and bevel gears 304b) connecting the rotor shaft 122 to the gearbox 306, and a first generator 308 connected to the gearbox 306. Also shown are fuel pump 310, lube module 312, hydraulic pump 314, and PMG 316 connected to the gearbox 306.

Figure 3B:
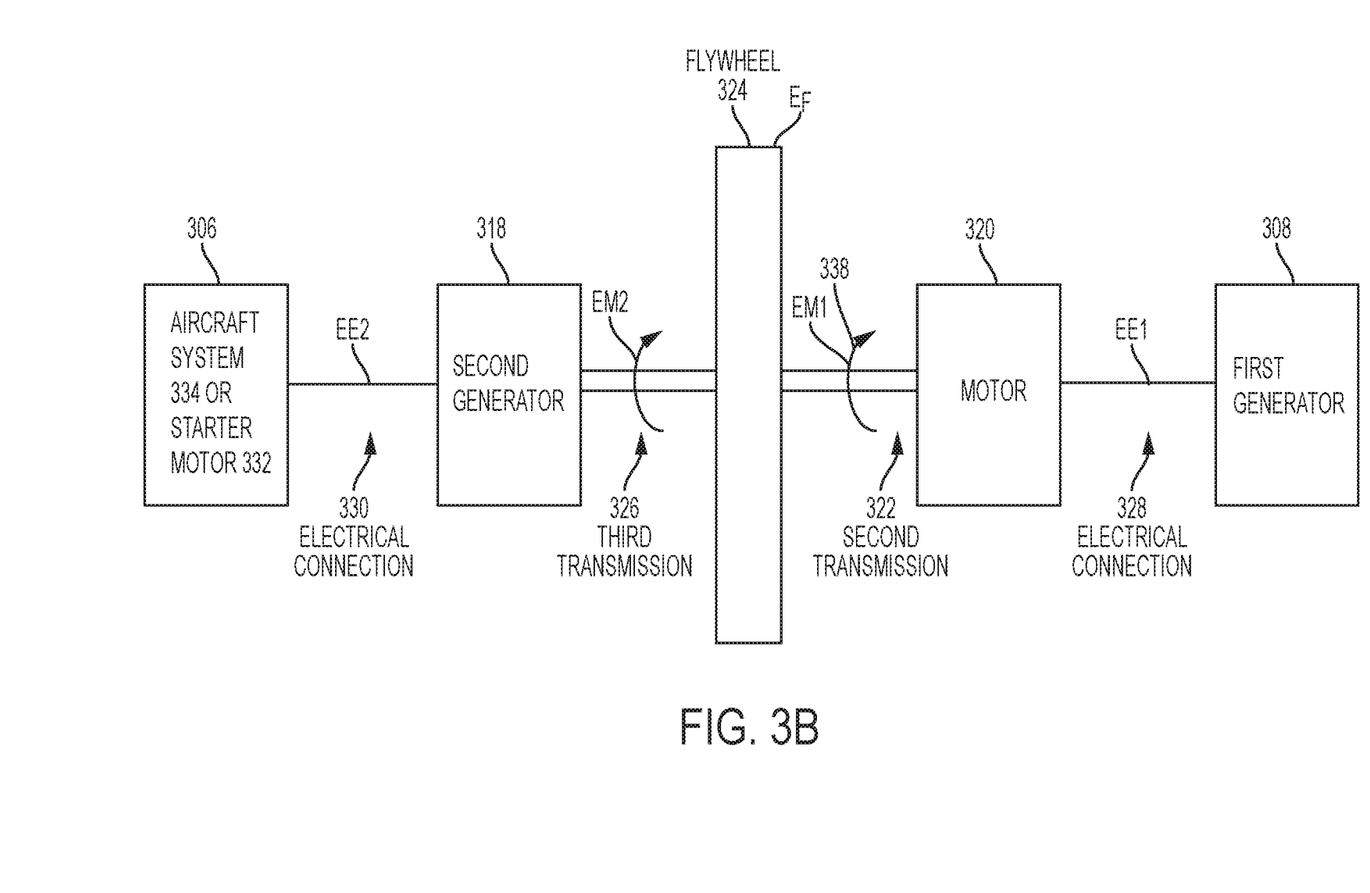
FIG. 3B illustrates a flywheel in combination with a motor-generator, according to one or more embodiments.

FIG. 3B illustrates the motor-generator in housing 302 typically comprises a second generator 318 and a first motor 320, a second transmission 322 connecting the flywheel 324 to the flywheel motor 320, and a third transmission 326 connecting the flywheel 324 to the second generator 318. An electrical connection 328 connects the flywheel motor 320 to the first generator 308 so that energy can be transferred to charge the flywheel 324. The second generator 318 is connected using electrical connection 330 to a second (e.g., starter) motor 332 or other aircraft system 334.

When engaged, the first transmission 304 transmits rotational energy $E_R$ of the rotor shaft 122 to the first generator 308 when the rotor shaft 122 is rotating 336. The first generator 308 converts the mechanical rotational energy $E_R$ of the rotor shaft 122 into first electrical energy EE1. The first motor 320, powered by the first electrical energy EE1 through electrical connection 328, drives the flywheel 324 using the second transmission 322, thereby charging/transferring a portion of the mechanical rotational energy $E_R$ of the rotor shaft 122 to the flywheel 324.

Figure 4A:
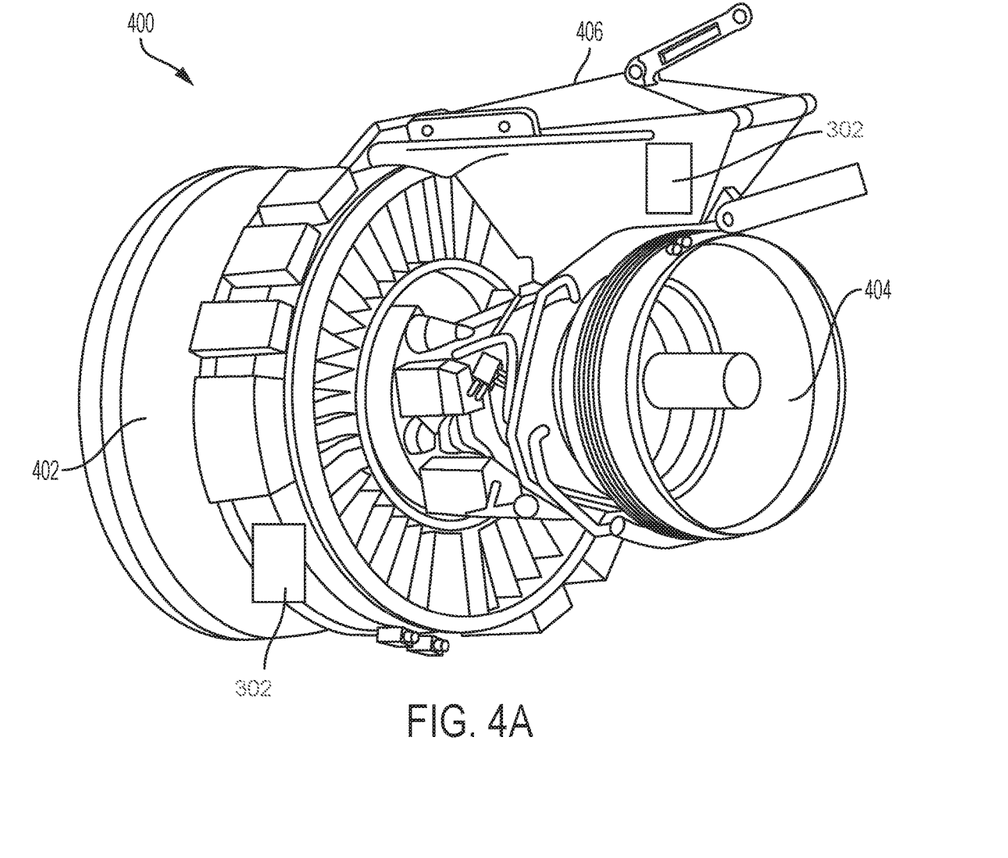
FIG. 4A illustrates installation of the flywheel on a fan case or inside an engine strut, according to one or more embodiments.

FIG. 4A illustrates an aircraft engine 400 comprising a casing 402 and an engine strut 406, showing possible locations for the housing 302 containing the motor-generator (comprising the second generator 318 and the first motor 320) and the flywheel 324. In one embodiment, the housing is 302 attached to the casing 402. In another embodiment, the housing 302 is inside and/or attached to the engine strut 406 attached to the engine 400. Electrical wires 330 transmit electrical energy E2 between the second generator 318 connected to the flywheel 324 and the second motor 332 on the accessory gearbox 306.

Figure 4B:
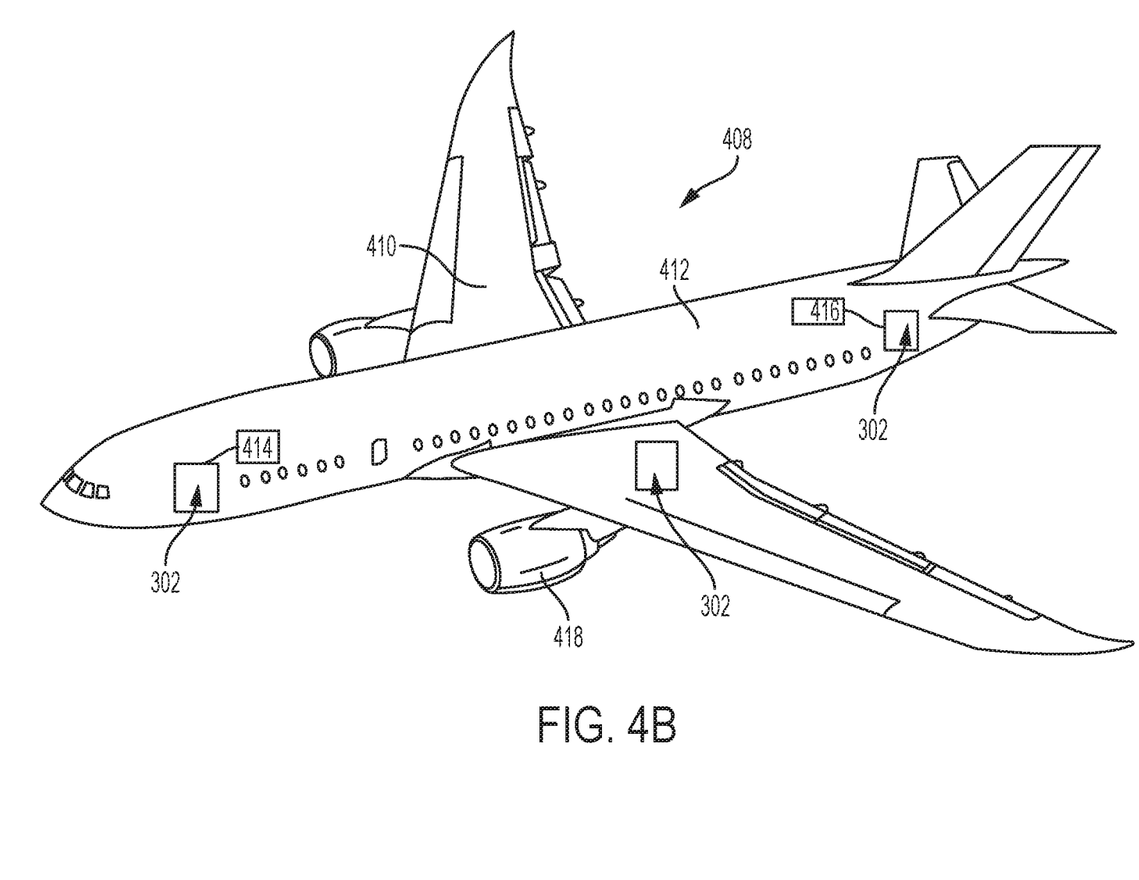
FIG. 4B illustrates installation of the flywheel in an aircraft wing or inside the aircraft's pressurized vessel, according to one or more embodiments.

FIG. 4B illustrates an aircraft 408 comprising a wing 410 a wing attached to a fuselage 412 and showing further possible locations for the housing 302 containing the motor-generator (comprising the first motor 320 and the second generator 318) and the flywheel 324. In one embodiment, the housing 302 is within the wing 410. In another embodiment, the housing 302 is inside the airplane's pressurized vessel or fuselage 412. FIG. 4B further illustrates an energy storage device 414 (e.g., battery) and electrical system 416 connected to the second generator 318.

FIG. 4B further illustrates a nacelle 418 housing the gas turbine engine 200, 300 so that the rotor shaft 122 is inside the nacelle 418 or is housed by the nacelle 418. In one or more embodiments, the nacelle 418 comprises trapped air 116 creating a temperature gradient T perpendicular to a longitudinal axis 128 of the rotor shaft 122.

Example System Components, Dimensions and Materials

In one or more embodiments, the transmissions 204, 304 comprise components typically used in aircraft engine transmissions and flywheel transmissions, e.g., one or more drive shafts, one or more clutches, and/or one or more torque converters.

Examples of electrical connections 328, 330 (e.g., between the generators 318, 308 and motors 320, 332) include, but are not limited to, electrical conduits, electrical wires, electrical wiring, and electrical cables.

As used herein, a generator 318, 308 is defined as a device (e.g., dynamo or alternator having armature windings and field coils or permanent magnets) converting mechanical energy into electrical energy.

Examples of materials used to fabricate the flywheel 324, 202 include, but are not limited to, carbon nanotubes, fused silica, and graphite composite.

In one or more embodiments, the flywheel systems described herein have weight and dimensions optimized for compactness to overcome weight and space constraints, e.g., so that the flywheel system can be integrated into the engines of smaller aircraft such as a Boeing 737 Max. However, the flywheel system can be implemented in all aircraft, including, but not limited to, Boeing 787, 777, and 747 aircraft.

Third Example: Load Leveling

The aircraft's electrical system 334 (e.g., powering air conditioning, cabin pressurization, and plumbing) adds various electrical loads during operation of the aircraft. Typically, some of the engine's rotational energy is converted into electrical energy in order to handle these additional loads. In this case, the engine then has to burn more fuel to maintain its original rotation speed. Consequently, the engine must be operated in such a way (i.e., with high enough speed) that it can withstand a sudden electrical load and maintain stability.

In one embodiment, the airplane extracts electrical power form the flywheel to help power the electrical systems on the aircraft at various times, e.g., during peak electrical demands. This alleviates the burden on the engine, enabling less fuel burn and lower engine speeds for most of the flight while still accommodating sudden electrical loads applied to the electrical system.

Peak electrical demands also impact engine sizing conditions. Conventionally, larger engines are used to mitigate for worst case energy scenarios. Use of the flywheel system to power the electrical system enables implementation of smaller, lighter engines that burn less fuel.

Fourth Example

In one embodiment, the flywheel is used as a load source or sink by the engine's control system so as to aid engine operability and engine acceleration rates during abnormal flight conditions.

Fifth Example: Rotor Shaft Bow Mitigation

As described above, the nacelle 418 or casing 106 comprises trapped air 116 creating the temperature gradient T perpendicular to a longitudinal axis 128 of the HP compressor 108 and rotor's shaft 122. In one embodiment, at least a portion of the rotational energy $E_R$ transferred from the rotor shaft 122 (and the HP compressor 108) to the flywheel 202, 324 is extracted from the flywheel 324, 202 and used to drive the rotor shaft 122 and HP compressor 108 when the gas turbine engine 200, 300 is cooling down in the temperature gradient T, thereby reducing or preventing thermal bowing of the rotor shaft 122 in the temperature gradient T. FIG. 3A shows an embodiment wherein a motor 332 (e.g., an engine turning motor (ETM) or starter motor) powered by the flywheel 324 is used to rotate 336 the rotor shaft 122 about axis 128. FIG. 2 shows an embodiment wherein the flywheel 202 drives rotation 218 of the rotor shaft 122 via transmission 204.

In one or more embodiments, rotation 220, 336 of the flywheel 202, 324 having rotational energy $E_F$ is used to rotate 218, 336 the rotor shaft 122 at one or more speeds, using one or more torques, and/or for one or more durations, so as to reduce or prevent the thermal bowing of the rotor shaft 122 in the temperature differential T. Examples of rotation speeds include, but are not limited to, low speeds such as between 0.5-2.0 rpm (revolutions per minute).

Rotation 218, 336 of the rotor shaft 122 includes, but is not limited to, pulsed rotation, continuous rotation, a combination of both pulsed rotation and continuous rotation, clocked rotation, and/or sporadic rotation.

In one embodiment, the stored energy $E_F$ in the flywheel is released slowly so that the rotor shaft 122 cools slowly and returns to thermal equilibrium. In another embodiment, the power generated from energy $E_F$ of the flywheel 324, 202 is supplied to the rotor shaft 122 periodically (i.e. once every 10 minutes, 30 minutes, hour, etc.) over a period of time (e.g., 8 hours) to promote an even temperature profile in the rotor shaft 122.

In another periodic pulsing scheme, torque provided by the flywheel 324, 202 is applied after a plurality of minutes (e.g. every 5-15 minutes) so that the rotor shaft 122 moves or rotates 218, 336 a partial turn or in increments. In one embodiment, partial turns are 'clocked,' e.g., for a one-half turn. In another example, the pulse provides random rotor shaft 122 movement. In one embodiment, pulse modulation is achieved by programming the second motor 332 to transfer increments of torque. In one embodiment, the flywheel rotates 218, 336 the shaft 122 by turning the shaft in one or more increments comprising a partial revolution of the shaft 122.

In one example, the rotation speed and duration are such that the probability of a compressor rub is less than e-8 per flight-hour.

Example System Features

One or more embodiments of the ETM system and flywheel system are installed in an aircraft using components such that:

the aircraft is capable of being dispatched for at least 10 days after a failure of the ETM and/or flywheel system;

failure of the ETM and/or flywheel system does not require line maintenance to dispatch the aircraft;

failure of the ETM and/or flywheel system does not interfere with engine operation, and in particular, does not interfere with engine start;

failure rate of the ETM and/or flywheel system is e-5 per flight hour or better;

the ETM and/or flywheel system are sufficiently reliable that a backup scheme is not required (e.g., the ETM and flywheel system has a reliability of at least e-6 per flight hour or at least e-7 per flight hour);

the ETM and flywheel system have a lock out feature, in case unforeseen issues arise and the system must be easily disabled;

energy demands for rotating the rotor and reducing the thermal bowing are reduced as compared to systems using an electric motor to rotate the rotor; and/or the installation and certification is easier as compared to systems using an electric motor to rotate the rotor (e.g., the ETM and flywheel system does not include a new ignition source or fuel source adding to engine fire protection designs).

Process Steps

Fabrication

Figure 5:
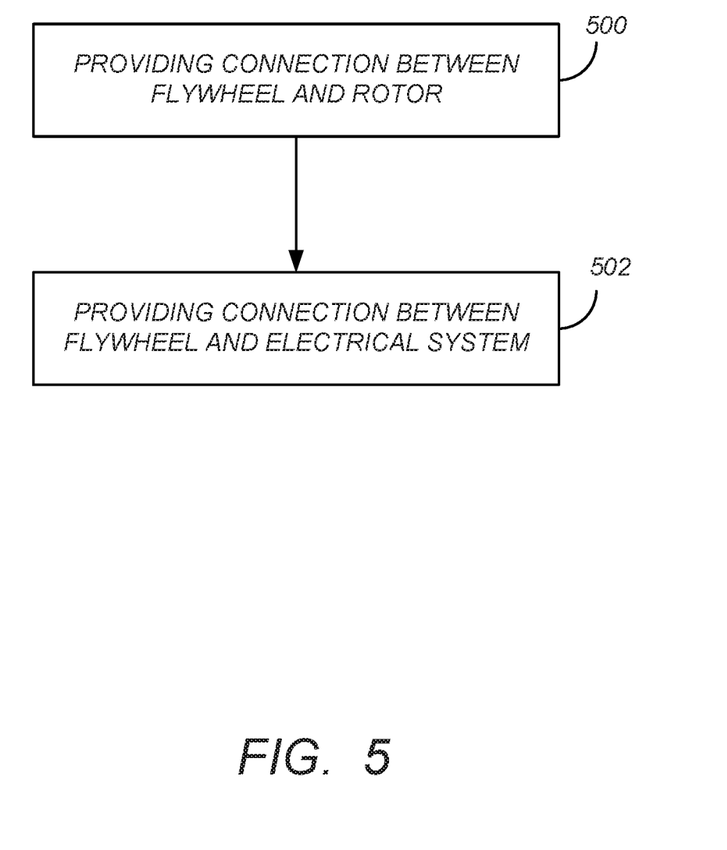
FIG. 5 is a flowchart illustrating a method of connecting a flywheel to the rotor shaft, according to one or more embodiments.

FIG. 5 illustrates a method of fabricating a system for transferring and storing energy on an aircraft.

Block 500 represents connecting a flywheel 202, 324 to the rotor shaft 122.

In one embodiment, the rotor shaft 122 is drivably coupled or drivably connected to the flywheel 202. In one example, the step comprises connecting a first transmission 204 between the rotor shaft 122 and a gearbox 206, and connecting the flywheel 202 to the gearbox 206, as illustrated and described in FIG. 2. The rotor shaft 122 is housed by or is inside a casing (e.g., casing 106 and casing comprising a nacelle 418).

In another embodiment, the rotor shaft 122 is drivably coupled or connected to the gearbox 306, and the flywheel 324 is drivably connected or coupled to a first motor 320 connected to the gearbox 306.

In one example, the step comprises connecting the gearbox 306 to a first generator 308; connecting the first generator 308 to a first motor 320, and connecting the first motor 320 to the flywheel 324 (a second transmission 322 connects the flywheel 324 to the first motor 320), as illustrated in FIG. 3A and FIG. 3B.

In one or more embodiments, the second transmission 322 further comprises a clutch or torque converter, for engaging the flywheel 324 to first motor 320.

Block 502 represents the optional step of connecting the flywheel 324 to an electrical system 416. The step comprises drivably connecting or coupling a second generator 318 to the flywheel 324 (a third transmission 326 connects the flywheel 324 to the second generator 318), e.g., as illustrated in FIG. 3B.

In one embodiment, the step comprises electrically connecting a second motor 332 (identified as starter motor in FIG. 3B) to the second generator 318, e.g., as illustrated in FIGS. 3A and 3B.

In another embodiment, the step comprises connecting an electrical system 416, 334 to the second generator 318, e.g., as illustrated in FIGS. 3B and 4B.

In one or more embodiments, the step further comprises connecting a clutch or torque converter in the third transmission 326 for engaging the flywheel 324 to the generator 318.

Operation

Figure 6:
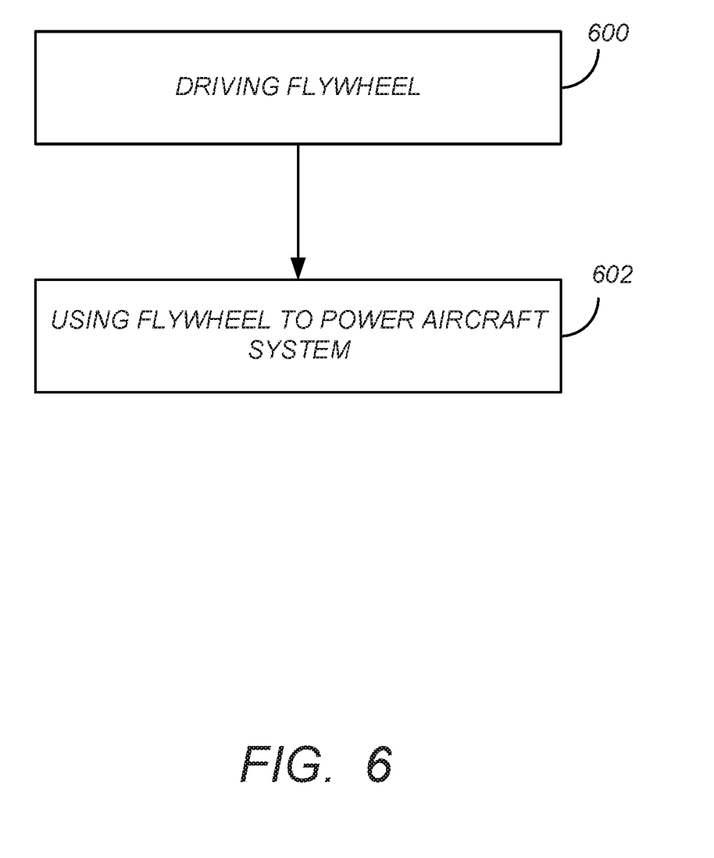
FIG. 6 is a flowchart illustrating a method of transferring energy to a flywheel, according to one or more embodiments.

FIG. 6 illustrates a method for transferring and storing energy on an aircraft.

Block 600 represents driving a flywheel 202, 324 using a HP compressor 108 in an aircraft engine assembly 200, 300, wherein rotational energy $E_R$ of the rotor shaft 122 (of the HP compressor 108) is transferred to the flywheel so as to generate flywheel rotational energy $E_F$ such that the flywheel 202, 324 rotates 338. In one embodiment, at least a portion of the energy $E_R$ is transferred between the rotor shaft 122 and the flywheel 202, 324 during engine 200 shutdown. In another embodiment, the flywheel 202, 324 is charged during flight of the aircraft comprising the engine 200, 300.

In one embodiment, the means for generating flywheel rotational energy $E_F$ (second rotational energy) from the rotor shaft's rotational energy $E_R$ (first rotational energy) comprises a first transmission 204 connected to the rotor shaft 122 and the flywheel 202, as illustrated and described in FIG. 2. The first transmission 204 transmits rotational energy $E_R$ from the rotor shaft 122 to the flywheel 202.

In another embodiment, the energy transfer comprises converting at least a portion of the rotational energy $E_R$ of the rotor shaft 122 of the HP compressor 108 (first rotational energy) into first electrical energy EE1; converting at least a portion of the first electrical energy EE1 into first mechanical energy EM1; and driving the flywheel 324 using at least a portion of the first mechanical energy EM1, so that the flywheel 324 has the flywheel rotational energy $E_F$. FIG. 3A and FIG. 3B illustrate the means for generating the flywheel rotational energy $E_F$, comprising converting energy between mechanical energy EM1, $E_R$ and electrical energy EE1. The means comprises a first transmission 304 connected to a gearbox 306; the gearbox 306 connected to a first generator 308; and the first generator 308 connected to a first motor 320. The first generator 308 converts a portion of the first rotational energy $E_R$ of the rotor shaft 122 into first electrical energy EE1 when the transmission 304 and the gearbox 306 transfer the first rotational energy $E_R$ to the first generator 308. The first motor 320 drives the flywheel 324 when the first electrical energy EE1 powers the first motor 320, thereby transferring a portion of the rotor shaft's rotational energy $E_R$ to the flywheel 324 and generating the second rotational energy $E_F$ (flywheel rotational energy) in the flywheel 324.

Block 602 represents using the flywheel rotational energy $E_F$ to power an aircraft system 416.

In one embodiment, the step comprises driving/rotating 218, 336 the rotor shaft 122 (e.g., HP compressor rotor shaft 122) using a portion of the flywheel rotational energy $E_F$ (second rotational energy) when the gas turbine engine 200, 300 is cooling down in the temperature gradient T caused by air 116 trapped in the casing 106 or nacelle 418, thereby reducing or preventing thermal bowing of the rotor shaft 122 in the temperature gradient T. In one embodiment, the rotating 218, 336 comprises turning the shaft 122 by one or more partial turns (each partial turn less than one revolution). In another embodiment, the rotating 218, 336 comprises turning the shaft 122 by more than one revolution.

In one embodiment, the means for driving the rotor shaft 122 comprises a transmission 204 connected to the rotor shaft 122 and the flywheel 202, as illustrated and described in FIG. 2. The first transmission 204 transmits a portion of the rotational energy $E_F$ from the flywheel 202 to the rotor shaft 122 when the rotor shaft 122 is cooling down in the temperature gradient T, thereby reducing or preventing thermal bowing of the rotor shaft 122 in the temperature gradient T.

Examples of the rotor shaft 122 include a low-pressure or a high-pressure shaft in a 2-spool engine 200, or a low-pressure or intermediate-pressure shaft in a 3 spool engine.

In another embodiment, the step comprises converting a portion of the flywheel rotational energy $E_F$ to second electrical energy EE2; converting at least a portion of the second electrical energy EE2 to second mechanical energy EM2; and driving the rotor shaft 122 using at least a portion of the second mechanical energy EM2. FIGS. 3A and 3B illustrate the means for transferring flywheel rotational energy, comprising converting energy between mechanical energy $E_F$, EM2 and electrical energy EE2. The means comprises a second generator 318, the second generator converting a portion the second rotational energy $E_F$ into second electrical energy EE2 (when the second generator 318 is driven by the flywheel 324); and a second motor 332 connected to the gearbox 306 and the second generator 318. The second generator 318 powers the second motor 332 using the second electrical energy EE2 supplied through electrical connection 330. The second motor 332 drives the rotor shaft 122 when powered using the second electrical energy EE2, thereby reducing or preventing thermal bowing of the rotor shaft 122 in the temperature gradient T.

In yet another embodiment, the step comprises converting a portion of the flywheel rotational energy $E_F$ into electrical energy EE2; and storing at least a portion of the electrical energy EE2 in an energy storage device 414 on the aircraft 408 and/or using at least a portion of the electrical energy EE2 to power an electrical system 416 on the aircraft 408 during times of peak electrical loading of the electrical system 416.

In one embodiment, the step further comprises reducing fuel consumption in the gas turbine engine 300 as compared to when the gas turbine engine 300 is used to power the electrical system 416 during the times of peak electrical loading without the flywheel 324. FIGS. 3A, 3B, and 4B illustrate the means for transferring flywheel rotational energy $E_F$, comprising connecting the second generator 318 (converting a portion the second rotational energy $E_F$ into second electrical energy EE2) to an electrical system 416 or energy storage device 414 (e.g. battery) so as to power an electrical system 416 and/or charge the energy storage device 414 so that the energy storage device 414 stores at least a portion of the second electrical energy EE2.

Processing Environment

Figure 7:
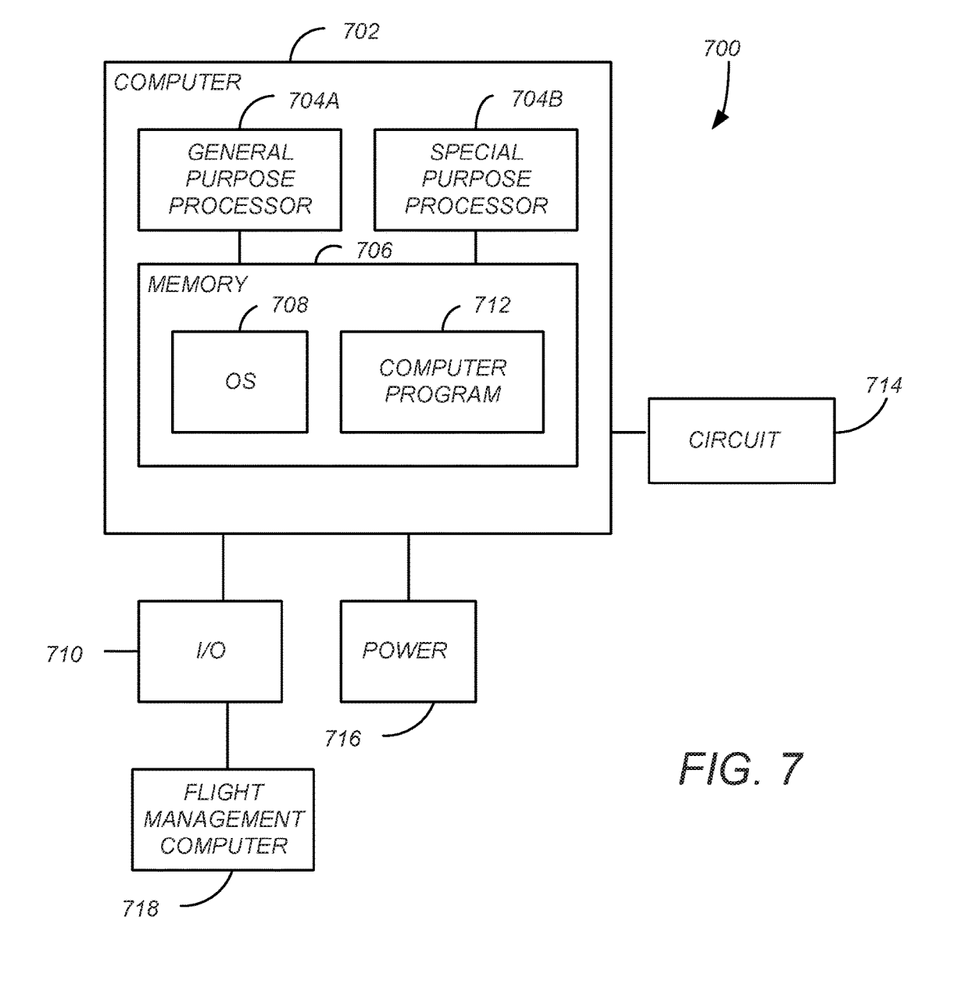
FIG. 7 illustrates a hardware environment according to one or more embodiments.

FIG. 7 illustrates an exemplary computer or system 700 that could be used to implement processing elements needed to control rotation (of the flywheel and/or rotor shaft) and control transfer of energy to/from the flywheel/rotor shaft. The computer system is typically located on the aircraft e.g., but not limited to, in a box mounted on the engine fan case or inside the aircraft.

The computer 702 comprises a processor 704 (general purpose processor 704A and special purpose processor 704B) and a memory, such as random access memory (RAM) 706. Generally, the computer 702 operates under control of an operating system 708 stored in the memory 706, and interfaces with the user/other computers to accept inputs and commands (e.g., analog or digital signals) and to present results through an input/output (I/O) module 710. The computer program application 712 accesses and manipulates data stored in the memory 706 of the computer 702. The operating system 708 and the computer program 712 are comprised of instructions which, when read and executed by the computer 702, cause the computer 702 to perform the operations herein described. In one embodiment, instructions implementing the operating system 708 and the computer program 710 are tangibly embodied in the memory 706, thereby making a computer program product or article of manufacture. As such, the terms "article of manufacture," "program storage device" and "computer program product" as used herein are intended to encompass a computer program accessible from any computer readable device or media.

In one embodiment, computer 702 comprises one or more field programmable gate arrays (FPGAs).

The system 700 further comprises a circuit required to activate/engage/control the transmissions 202a, generators 318, 308, and motors 332, 320 transferring energy between the rotor shaft 122 (of the HP compressor 108) and the flywheel 202, 324 and/or between the flywheel 202, 324 and the electrical system 416 or energy storage device 414.

In one embodiment, the computer 702 comprises a circuit 714 activating the transmission/connections between the flywheel and the rotor shaft, so that rotational energy from the rotor (including rotor shaft) is transferred to the flywheel, or so that rotational energy of the flywheel is transferred to the rotor shaft 122. In one embodiment, an Electronic Engine Control (EEC) unit sends a digital request to the controller via I/O 710 to reduce, increase, and/or modify electrical power supplied by the generators and/or motors through the circuit 714, thus controlling compressor 108 rotor speeds or load leveling. In yet another embodiment, the computer 702 provides status to the EEC via I/O 710 so that the controller and/or the EEC monitor system monitor performance and/or control the rotation of the HP compressor 108 or supply of power to the electrical system, and/or monitor slowing of the flywheel as energy is extracted from the flywheel.

In one embodiment, the computer 702 is connected to a flight management system via I/O 710. The flight management system is a computer 718 that controls fuel consumption of the engine 400 during flight, in response to power provided to the electrical system 416 or the engine 400 by the flywheel. In one embodiment, the flight management system computer 718 reduces fuel consumption in the gas turbine engine 300 as compared to when the gas turbine engine 300 is used to power the electrical system 416 during the times of peak electrical loading without the flywheel 324.

In one embodiment, the computer 702 is a controller receiving a signal through I/O 712 from an engine shut off switch after engine shut down, thereby activating the means transferring energy between the rotor shaft and the flywheel. In this way, the flywheel is used to rotate the rotor shaft soon/immediately after engine shut down so as to minimize aircraft departure delays caused by mitigating rotor shaft bow. In another embodiment, the computer 702 activates the means transferring energy from the flywheel to the rotor shaft, so as to rotate the rotor shaft prior to engine start (i.e., prior to motoring the engine).

In another embodiment, the duration of rotation is optimized by having the computer 702 estimate the amount of bow (based on time since last engine shutdown) and calculate the required rotation duration to be implemented. Various instrumentation to monitor the bowing can include accelerometers already used for vibration monitoring or microwave-based gap measuring sensors.

FIG. 7 further illustrates a power source 716 for providing power to the system 700.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An apparatus, comprising:
an aircraft engine including a rotor shaft, wherein the rotor shaft is inside a casing; and
a flywheel; and
a transmission connecting the rotor shaft and the flywheel, and wherein:
second rotational energy in the flywheel is generated from first rotational energy of the rotor shaft transmitted to the flywheel through the transmission,
after shutdown of the aircraft engine, the transmission drives the rotor shalt using a portion of the second rotational energy when the aircraft engine is cooling down in a temperature gradient in the casing;
the casing comprises trapped air creating the temperature gradient perpendicular to a longitudinal axis of the rotor shaft, and
the portion of the second rotational energy driving the rotor shaft reduces or prevents thermal bowing of the rotor shalt in the temperature gradient.

2. The apparatus of claim 1, wherein the transmission comprises:
a transmission shaft connecting a gearbox to the rotor shaft;
the gearbox connected to a first motor and a first generator;
the first motor connected to a second generator;
the first generator connected to a second motor; and
wherein:
the first generator converts a portion of the first rotational energy of the rotor shaft into first electrical energy when the transmission and the gearbox transfer the first rotational energy to the first generator,
the second motor drives the flywheel when powered using the first electrical energy, thereby generating the second rotational energy in the flywheel,
the second generator converts a portion the second rotational energy into second electrical energy, when the second generator is driven by the flywheel, and
the first motor drives the rotor shaft when powered using the second electrical energy.

3. An aircraft comprising:
an aircraft engine including a rotor shaft, wherein the rotor shaft is inside a casing;
a flywheel;
a transmission connecting the rotor shaft and the flywheel, wherein;
second rotational energy in the flywheel is generated from first rotational energy of the rotor shaft transmitted to the flywheel through the transmission,
after shutdown of the aircraft engine, the transmission drives the rotor shaft using a portion of the second rotational energy when the aircraft engine is cooling down in a temperature gradient in the casing;
the casing comprises trapped air creating the temperature gradient perpendicular to a longitudinal axis of the rotor shaft, and
the portion of the second rotational energy driving the rotor shaft reduces or prevents thermal bowing of the rotor shaft in the temperature gradient and;
further comprising:
a computer connected to an electrical system; and
wherein the transmission includes:
a first transmission connected to a gearbox;
the gearbox connected to a first generator;
the first generator connected to a motor;
a second transmission connecting the motor to the flywheel; and
a second generator connected to the flywheel; and
wherein:
the first generator converts a portion of the first rotational energy of the rotor shaft into first electrical energy when the first transmission and the gearbox transfer the first rotational energy of the rotor shaft to the first generator,
the motor drives the flywheel when powered using the first electrical energy, thereby generating the second rotational energy in the flywheel,
the second generator converts a portion the second rotational energy into second electrical energy powering the electrical system during times of peak electrical loading of the electrical system, when the second generator is driven by the flywheel, and
the computer reduces fuel consumption in the aircraft engine engine as compared to when the aircraft engine engine is used to power the electrical system during the times of peak electrical loading without the flywheel.

4. An apparatus, comprising:
a gas turbine engine having a rotor shaft;
a flywheel; and
a first transmission connecting the rotor shaft to a gearbox, wherein:
the flywheel is connected to the gearbox, or
the gearbox is connected to a first generator, the first generator is connected to a first motor, a second transmission connects the flywheel to the first motor, and a third transmission connects the flywheel to a second generator; and
an electrical system connected to the second generator; wherein:
flywheel rotational energy in the flywheel is generated from rotational energy of the rotor shaft transmitted to the flywheel using the first transmission;
the second generator converts a portion of the flywheel rotational energy into second electrical energy, and
the second electrical energy powers the electrical system powering air conditioning on an aircraft, or powering cabin pressurization on the aircraft, or powering the air conditioning and the cabin pressurization.

5. The apparatus of claim 4, wherein:
the gas turbine engine is inside a casing, and
the gearbox is attached to the casing.

6. The apparatus of claim 5, wherein:
the casing comprises trapped air creating a temperature gradient perpendicular to a longitudinal axis of the rotor shaft, and the first transmission transmits a portion of the flywheel rotational energy from the flywheel to the rotor shaft when the rotor shaft is cooling down in the temperature gradient, thereby reducing or preventing thermal bowing of the rotor shaft in the temperature gradient.

7. The apparatus of claim 4, wherein:
the first transmission transmits the rotational energy of the rotor shaft to the first generator,
the first generator converts the rotational energy into first electrical energy, and
the first electrical energy powers the first motor driving the flywheel, thereby transferring a portion of the rotational energy to the flywheel and generating the flywheel rotational energy.

8. The apparatus of claim 7, further comprising:
a second motor connected to the gearbox and the second generator; and
a casing, wherein the gas turbine engine is inside the casing and the casing comprises trapped air creating a temperature gradient perpendicular to a longitudinal axis of the rotor shaft, wherein:
the second generator converts a portion of the flywheel rotational energy into the second electrical energy powering the second motor, and
the second motor drives the rotor shaft, using the second electrical energy,
when the rotor shaft is cooling down in the temperature gradient, thereby reducing or preventing thermal bowing of the rotor shaft in the temperature gradient.

9. An aircraft comprising the apparatus of claim 7, the aircraft further comprising:
a computer connected to the gas turbine engine, wherein:
the second generator converts a portion of the flywheel rotational energy into the second electrical energy powering the electrical system during times of peak electrical loading of the electrical system, and
the computer reduces fuel consumption in the gas turbine engine as compared to when the gas turbine engine is used to power the electrical system during the times of peak electrical loading without the flywheel.

10. An aircraft comprising the apparatus of claim 4, further comprising:
an energy storage device connected to the second generator; wherein
the energy storage device stores the second electrical energy.

11. The apparatus of claim 4, further comprising:
a casing housing the gas turbine engine;
an engine strut attached the gas turbine engine; and
a housing containing the flywheel, the first motor, and the second generator, wherein the housing is attached to the casing or the engine strut.

12. An aircraft comprising the apparatus of claim 4, further comprising:
a fuselage;
a wing attached to the fuselage; and
a housing containing the flywheel, the first motor, and the second generator, wherein the housing is within the fuselage or within the wing.

13. A method for transferring energy, comprising:
driving a flywheel using a rotor shaft in an aircraft engine assembly, thereby generating flywheel rotational energy;
driving the rotor shaft using a portion of the flywheel rotational energy after shutdown of the aircraft engine assembly when the aircraft engine assembly is cooling down in a temperature gradient wherein;
the rotor shaft is inside a casing comprising trapped air creating the temperature gradient perpendicular to a longitudinal axis of the rotor shaft, and
the driving reduces or prevents thermal bowing of the rotor shaft in the temperature gradient; and/or
converting a portion of the flywheel rotational energy into electrical energy;
using the electrical energy to power an electrical system on an aircraft during times of peak electrical loading of the electrical system, the electrical system powering air conditioning on the aircraft, or powering cabin pressurization on the aircraft, or powering the air conditioning and the cabin pressurization; and
reducing fuel consumption in the aircraft engine assembly as compared to when the aircraft engine assembly is used to power the electrical system during the times of peak electrical loading without the flywheel.

14. The method of claim 13, further comprising:
converting a portion of the rotor shaft's rotational energy into first electrical energy;
converting a portion of the first electrical energy into first mechanical energy; and
driving the flywheel using the first mechanical energy, so that the flywheel has the flywheel rotational energy.

15. The method of claim 14, further comprising:
converting a portion of the flywheel rotational energy into second electrical energy;
converting a portion of the second electrical energy into second mechanical energy; and
driving the rotor shaft using the second mechanical energy.

16. The method of claim 13, further comprising:
converting a portion of the flywheel rotational energy into the electrical energy; and
storing the electrical energy in an energy storage device on the aircraft.

17. The method of claim 13, further comprising:
converting a portion of the flywheel rotational energy into the electrical energy;
using the electrical energy to power the electrical system on the aircraft during the times of the peak electrical loading of the electrical system; and
reducing the fuel consumption in the aircraft engine assembly as compared to when the aircraft engine assembly is used to power the electrical system during the times of the peak electrical loading without the flywheel.

* * * * *